US007794865B2

(12) United States Patent
Cohen

(10) Patent No.: US 7,794,865 B2
(45) Date of Patent: *Sep. 14, 2010

(54) FILTER MATERIAL FOR GENERATING OXYGEN AND/OR HYDROGEN FROM A SOURCE

(76) Inventor: Binyomin A. Cohen, 225 Park Pl., Brooklyn, NY (US) 11238

( * ) Notice: Subject to any disclaimer, the term of this patent is extended or adjusted under 35 U.S.C. 154(b) by 0 days.

This patent is subject to a terminal disclaimer.

(21) Appl. No.: 12/459,706

(22) Filed: Jul. 7, 2009

(65) Prior Publication Data

US 2009/0272273 A1 Nov. 5, 2009

Related U.S. Application Data

(63) Continuation of application No. 12/231,695, filed on Sep. 5, 2008, now Pat. No. 7,579,103.

(60) Provisional application No. 60/967,756, filed on Sep. 7, 2007.

(51) Int. Cl.

| | |
|---|---|
| ***B01J 23/30*** | (2006.01) |
| ***C25B 1/10*** | (2006.01) |
| ***C25B 9/08*** | (2006.01) |
| ***C25B 15/08*** | (2006.01) |
| ***C01G 41/02*** | (2006.01) |
| ***H01M 4/48*** | (2010.01) |

(52) U.S. Cl. ......................... 429/40; 429/229; 423/579; 423/594.13; 502/307; 502/400; 205/349

(58) Field of Classification Search .................. 429/40, 429/229; 423/579, 594.13; 502/307, 400; 205/349; *C25B 1/10, 9/08, 15/08; B01J 23/30; C01G 41/02*

See application file for complete search history.

(56) References Cited

U.S. PATENT DOCUMENTS

| | | | | |
|---|---|---|---|---|
| 2,944,627 | A | 7/1960 | Skarstrom | |
| 3,313,091 | A | 4/1967 | Berlin | |
| 4,222,750 | A | 9/1980 | Gauthier et al. | |
| 6,979,244 | B2 * | 12/2005 | Den et al. | 445/24 |
| 7,085,125 | B2 * | 8/2006 | Sung | 361/502 |
| 7,208,244 | B2 * | 4/2007 | Shannon et al. | 429/40 |
| 7,381,683 | B1 * | 6/2008 | Wang et al. | 502/327 |

(Continued)

OTHER PUBLICATIONS

Tang et al, high dispersion and electrocatalytic properties of platinum on well-aligned carbon nanotube arrays (Carbon, 2004, 42:191-197).*

(Continued)

*Primary Examiner*—Melvin C Mayes
*Assistant Examiner*—Jun Li
(74) *Attorney, Agent, or Firm*—Dilworth & Barrese, LLP.

(57) ABSTRACT

A filter material for generating oxygen and/or hydrogen gas from a source having a porous boron doped carbon film with diruthenium/diruthenium molecules in direct contact with the porous boron doped carbon film, a synthetic film having at least one zeolite crystalline body in direct contact with the nanocarbon tubules, or both in a continuous alternating arrangement.

21 Claims, 4 Drawing Sheets

U.S. PATENT DOCUMENTS

| | | | | |
|---|---|---|---|---|
| 2004/0151961 | A1 * | 8/2004 | Morishima et al. | 429/32 |
| 2005/0067346 | A1 * | 3/2005 | Noack et al. | 210/503 |
| 2005/0110024 | A1 * | 5/2005 | Swain et al. | 257/77 |
| 2006/0057054 | A1 * | 3/2006 | Fujioka et al. | 423/447.2 |
| 2006/0257566 | A1 * | 11/2006 | Fan et al. | 427/248.1 |
| 2007/0194391 | A1 * | 8/2007 | Murthy et al. | 257/387 |
| 2009/0008261 | A1 * | 1/2009 | Kotzeva et al. | 205/349 |

OTHER PUBLICATIONS

*Preparation of boron carbon nitride thin films by radio frequency magnetron sputtering*, Applied Surface Science,vol. 252, Issue 12, Apr. 15, 2006, pp. 4185-4189., Lihua Liu, Yuxin Wang, Kecheng Feng, Yingai Li, Weiqing Li, Chunhong Zhao, Yongniaan Zhao.

*A stable argon compound*. Leonard Khriachtchev, Mika Pettersson, Nino Runeberg, Jan Lundell & Markku Räsänen. Department of Chemistry, PO Box 55 (A.I.Virtasen aukio 1), FIN-00014 University of Helsinki, Finland. Nature 406, 874-876 (Aug. 24, 2000).

*The Design and Operation of Turbulent Bed Contactors*, Professor Ian Shackley, Department of Chemical and Process Engineering. 2001.

Chemistry of Polynuclear Compounds. Part XVII. Some Carboxvlate Complexes of Ruthenium and Osmium Carbonyls, G.R. Crooks, B.F.G. Johnson, J. Lewis et al J. Chem. Soc. A, 1969 2761.

*Calamitic liquid crystals containing metal-metal bonds: design of mesomorphic materials based on the* $Ru_2$ *(CO)*$_4$ ($\mu$-n$^2$-$O_2$CR)$_2$L$_2$ *sawhorse unit*, Robert Deschenaux, Bertrand Donnio, Gerd Rheinwald, Frédéric Stauffer, George Süss-Fink and Jörg Velker; J. Chem. Soc., Dalton Trans., 1997, pp. 4351-4355.

*Hydroxylation of Alkanes with Molecular Oxygen Catalyzed by a New Ruthenium Substituted Polyoxometalate,* [*WZnRu sub 2, supra III (OH)(H sub 2O)(ZnW sub 9 Osub 34) sub 2*] *supra 11.*, Ronny Neumann, Alexander M. Khenkin and Mazal Dahan., Casali Institue of Applied Chemistry, The Hebrew University of Jerusalem. Angew. Chem. Int. Ed. Engl. 1995, 34 No. 15.

*Ruthenium-catalysed ortho alkylation of hydroxyacetophenones; the functionalisation of ring C aromatic diterpenoids*, Paul W.R. Harris, Paul D. Woodgate, Journal of Organometallic Chemistry; 530 (1997); pp. 211-223.

*Respiratory Therapy Equipment*, Stephen P. McPherson, RRT, 2nd Ed. S.P. McPherson, pp. 3-48.

*Noble Metal* (*RuIII, PdII, PtII*) *Substituted "Sandwich" Type Polyoxometalates: Preparation, Characterization, and Catalytic Activity in Oxidations of Alkanes and Alkenes by Peroxides*, Inorganic Chemistry 1995, 34 (23), 5753-5760., Neumann, R.; Khenkin, A.

* cited by examiner

FILTER MATERIAL FOR GENERATING OXYGEN AND/OR HYDROGEN FROM A SOURCE

CROSS-REFERENCE TO RELATED APPLICATIONS

The present application is a continuation of application Ser. No. 12/231,695 filed on Sep. 5, 2008, now U.S. Pat. No. 7,579,103 now allowed, which claimed priority to U.S. Provisional Application Ser. No. 60/967,756 filed Sep. 7, 2007, to which the present application claims priority to both applications and both applications are incorporated herein by reference.

FIELD OF THE INVENTION

The present invention relates to a filter material for the oxidation of water and/or exhaled air to bimolecular oxygen and/or hydrogen gas. In particular, a filter material containing at least one diruthenium/diruthenium complex affixed to a boron doped carbon film and a synthetic film containing zeolite crystalline. The filter material of the present invention provides not only a high separation efficiency due to the use of the complex, but also provides additional separation efficiency by coupling the catalyst properties of the diruthenium/diruthenium complex with the adsorption high separation efficiency of the zeolite with embedded nanocarbon tubules.

BACKGROUND OF THE INVENTION

Historically oxygen generation has been achieved by electrolysis of water, photolysis and chemical conversions. One method still in use today is the Pressure Swing Adsorption Cycles ("PSA") as described in U.S. Pat. No. 2,944,627 which is herein incorporated by reference. In a PSA system oxygen is produced by the selective adsorption of nitrogen from a feed air stream. The PSA has at least one, often two adsorbent beds, which are designed to attract oxygen gases at low pressures and release the adsorbed oxygen at higher pressures. The PSA processes can be used to separate gases in a mixture because certain gases tend to be attracted to different solid surfaces more or less strongly than others.

Another oxygen generation process that uses some of the principals of the PSA process is called the Vacuum Swing Adsorption (VSA). In a "VSA" process, gases are separated using pressure but unlike the PSA process it is done at lower absolute pressures. Although these methods do work, they require multiple pressurized vessels and valve systems making portability difficult if not impossible. That is, these systems require valve operations either done automatically or by carefully calculated timing cycles controlled by a PLC. Accordingly, these systems are quite large and therefore prevent a patient from directly wearing oxygen-generating system as a portable system.

Over the years, improvements to the PSA and VSA systems were made such as in U.S. Pat. No. 3,313,091 incorporated herein by reference. While the earlier PSA and VSA systems used crossover valving and zeolite adsorbing material to produce a product high in oxygen purity, these systems were neither consistent nor simple. To maintain consistent oxygen product, U.S. Pat. No. 3,313,091 used a vacuum pump to draw part of the adsorbed termed "waste gases" from the vessel or bed being purged. These advancements over the earlier PSA and VSA systems however, required more complex electromechanical design additions including added phase controlling, e.g. gas entry, vacuuming re-pressurization and dumping to allow oxygen gas as a product of several cycles to transfer through and out to a user or patient did provide a higher yield. Nor did it compensate for the problems of associated with nitrogen loading to oxygen ratios, or electrostatic charge build up on the zeolite surface, clogging and preventing transfers and fouling.

The next advancement in oxygen filtration came in 1980 and was described in U.S. Pat. No. 4,222,750, which is herein incorporated by reference. In this patent the vessels or beds of adsorbing filtration materials cyclically underwent both periods of adsorption in which said vessel or bed received gas from a compressor then reabsorbed from the beds using a vacuum pump. As one can see, this improvement added even more equipment to the systems making it even less likely to be used as a portable system.

Therefore, what are needed are filters that can be used without electrostatic charge build up, nitrogen loading to oxygen adsorption ratios plugging, and that eliminate expensive and bulky pressurized chambers/valves and other large equipment that can generate sufficient amounts of oxygen to be used in a portable breathing device. That is a filer material that can be produce oxygen at a rate and concentration necessary to maintain breathing is a patient without pressurizing and depressurizing chambers and opening and closely complex valve systems. The present invention provides a filter material that overcomes the short comings of the prior art and can be used in a truly portable oxygen generating system capable of maintaining proper oxygen levels necessary for breathing by a patient. The present invention is discussed in the section below.

SUMMARY OF THE INVENTION

The present invention is directed to filter material that does not require pressurized chambers to operate. In particular, the present invention is directed to a filter material for removing oxygen and/or hydrogen gas from water and/or exhaled air comprising a porous boron doped carbon film comprising diruthenium/diruthenium molecules and at least one type of electronegative ion in direct contact with the porous boron doped carbon film whereby oxygen and/or hydrogen gas is generated from a source as it passes across said filter material.

In one embodiment of the present invention, one diruthenium molecule of each the diruthenium/diruthenium molecules of the doped boron carbon film has the following formula $[Ru_2(CO)_4(u\text{-}n^{2-}O_2CR)_2L_2]_x$ wherein u is a bridging ligand selected from the group consisting of $[Ru_2(EDTA)_2]^{2-}$, $(CO)_4$, $F^-$, $Co_3^{-2}$, $NO^+$ (Cationic), Hydrogen-bonded aromatic/carboxylic Acid—(either for multiple attachments as polymerization or singular, at the double bonded oxygen or sites within), ethylenediamine, halides as anionic ligands, carboxylic acid, unsaturated hydrocarbons, nitric acid coordinating to a metal center either linear or bent, butadiene, carboxylate ligands, anionic (RO— and $RCO_2^{-2}$ (wherein R is H or alkyl group) or neutral ligands ($R_2$, $R_2S$, CO, $CN^-$) $CH_3CN$ (Acetonitrile), $NH_3$ (ammonia amine) $F^-$, $Cl^-$, tris(pyrazolyl)borates, Scorpionate Ligand" a boron bound to three pyrazoles; the "pincers" of the compound refer to the nitrogen hetero atoms from two of the pyrazole groups ($C_3H_4N_2$) which can bind a metal) and mixtures thereof, preferably $[Ru_2(EDTA)_2]^{2-}$;

wherein n is at least 2 and depends on the denticity of the molecule—(that is, the number of donor groups from a given ligand attached to the same central atom);

wherein L is a ligand selected from the group consisting of $[Ru_2(Ph_2PCH_2CH_2PPh_2)(EDTA)]^{2+}$, $C_6H_6$, $R_2C{=}CR_2$ (wherein R is H or an alkyl), 1,1-Bisdiphenylphosphino methane, diethylenetriamine [diene] bonds preferably tridentate, triazacyclononane [diene] bonds preferably tridentate, triphenylphosphine and mixtures thereof;

wherein CR is carboxylic acid, carboxylate ligands, anionic ($RO^-$ and $RCO_2^-$ (wherein R is an alkyl group)) or neutral ligands ($R_2$, $R_2S$, $CO^-$, $CN^-$ (wherein R is an alkyl group)) and mixtures thereof; and x is about 1 to about 30, preferably 1 to about 20 and more preferably 1 to about 10.

The other diruthenium molecule of each the diruthenium/diruthenium molecules of the doped boron carbon film is attached to a diruthenium-substituted polyoxometalate as an electrochemical catalyst having the following formula $[WZnR^{III}_2\ (OH)(H_2O)(ZnW_9O_{34})_2]^{-14}$. In addition to these features, the porous boron doped carbon film may further comprise an embedded nanocarbon tubular mesh network.

Since ruthenium ions can have adverse effects on a patient should the ions become free from the filter, the filter material of the present invention may further comprise a ruthenium ion capturing siderophore. The siderophore can be connected to the opposite surface of the porous boron doped carbon film in which the diruthenium/diruthenium molecules are attached. The siderophore can be in the form of a plate or structured as a hollow tub made from a light metallic alloy, aluminum copper oxide as example, the hollow tube is impregnated polysulfate resin, EDTA or mixture thereof. The hollow tube can have a plurality of pores dispersed throughout so as to aid in the capturing of free ionically charged ions. In particular, the siderophore can be charged so as to capture any free ruthenium ions that may become dislodged from the porous boron doped carbon film before they enter into a patient.

The filter material may also comprise a thin synthetic film with carbon nanotubles attached to the film and zeolite crystalline bodies in direct contact with the nanocarbon tubules. Zeolites typically are hydrated aluminosilicate minerals having micro-porous structures. Accordingly, the synthetic zeolite synthetic film of the present invention operates as a molecular sieve where the maximum size of the molecular or ionic species that can enter the pores of a zeolite is controlled by the diameters of the tunnels in the sieve that are conventionally defined by the ring size of the aperture. For example, a zeolite complex having an 8-ring structure is a closed loop built from 8 tetrahedrally coordinated silicon (or aluminum) atoms and 8 oxygen atoms and itself comprises a multiplicity of pores. In other words, the size of the apertures in the zeolite synthetic film that controls entry of the particular ions into the internal pore volume of the zeolite synthetic film and is determined by the number of T atoms (T=Si or Al) and oxygen in the ring. The apertures are classified as ultra large (>12 membered ring) (large 12), medium (10) or small (8). Aperture sizes range form about 0.4 nm for an 8 ring structure such as zeolite A, about 0.54 nm for a 10 ring structure such as ZSM-5 and about 7.4 nm for a 12 ring structure such as zeolite X and ZSM-12, all of which can used in the present invention.

The synthetic film itself comprises a multiplicity of pores having a diameter of about 0.1 to about 3.0 nm providing an oxygen sieving effect ($O_2$=2.96 $A^0$ and $N_2$=3.16 $A^0$). The zeolite crystalline bodies attached to the nanocarbon tubules overlap at least part of the pores. The porous boron doped carbon film comprising diruthenium/diruthenium molecules together with the thin synthetic film having carbon nanotubles attached and zeolite crystalline bodies in direct contact with the nanocarbon tubules form a repeating unit that can be used to make up a filter that can be used to remove oxygen and/or hydrogen gas from a supply source.

Additional embodiments and details of the present invention are provided in the figures and the Detailed Description section below.

DETAILED DESCRIPTION OF THE INVENTION

Figure 1:
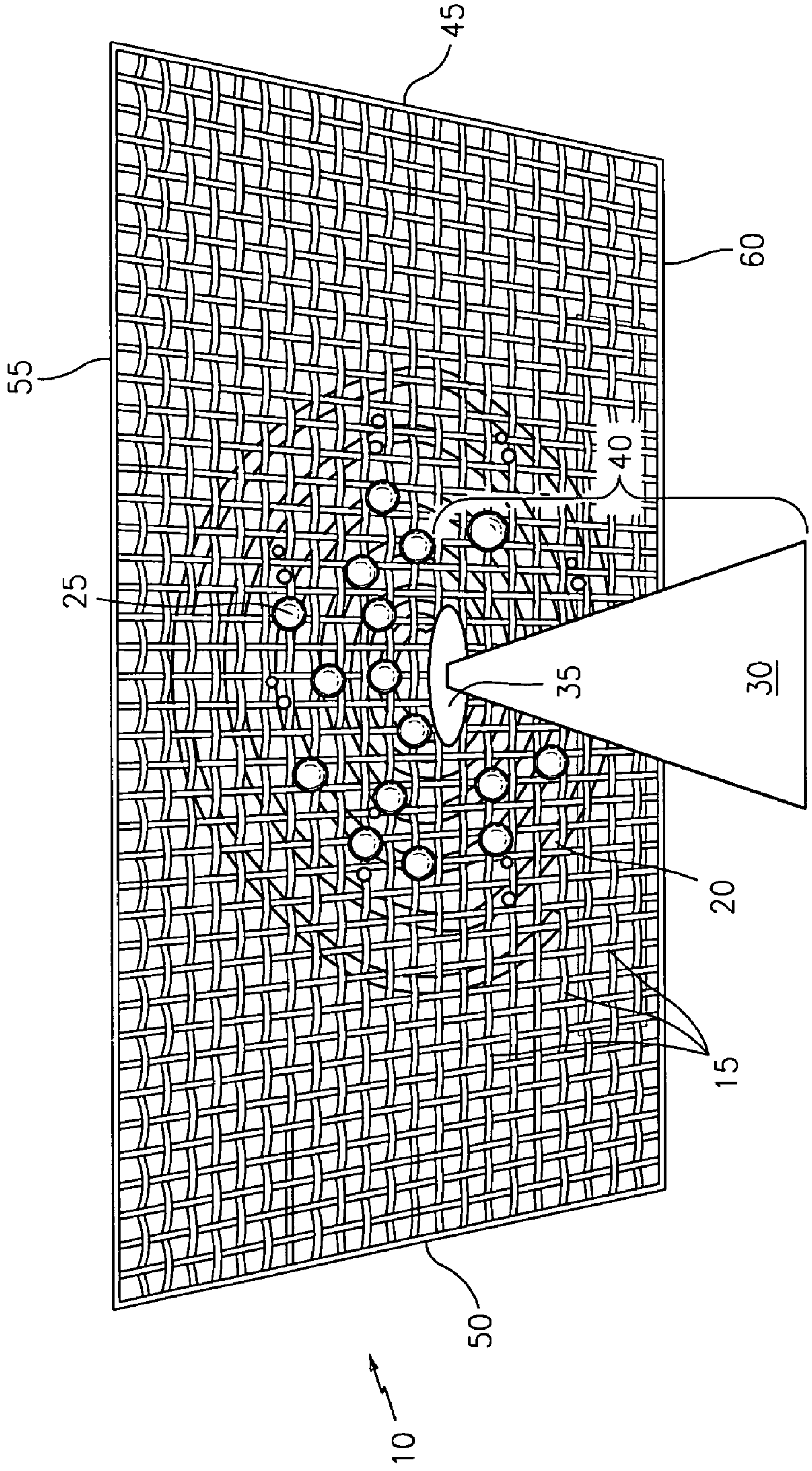
FIG. 1 shows a prospective view of the front surface of the porous boron doped carbon film comprising diruthenium/diruthenium molecules of the filter material of the present invention.

The present invention is directed to high oxygen generating filter material comprising two different catalytic screens in alternating orientation. The diruthenium/diruthenium screen functioning as an electrocatalyst generating oxygen, the other a zeolite an adsorption screen. Together and both types of screens having embedded nanocarbon tubular mesh networks allow for greater oxygen production and at much higher flow rates achievable than prior art. In the prior PSA and VSA systems rapid breathing patients and or higher flow rates above 5 LPM displayed a diminishing oxygen concentration leaving the apparatus, typically liter flows exiting such prior art systems above 6.5 LPM showed measured 4-8% diminution in oxygen concentrations generated, the invention achieves liter flows of 8-12 LPM with little to no oxygen concentration effects, less than 1-2% diminution.

The alternating orientation is specifically designed to prevent both the build up of radical intermediates during oxygen generation that cause decomposition of the oxygen generating filter and build up of excess water on the filter material. As well as a design incorporating the use of electrostatic charge build up removal and venting of surface filter constituents not adsorbed that prior art does not have, certainly cannot achieve in portability.

The first screen of the alternating filter material is a porous boron doped carbon film comprising diruthenium/diruthenium molecules and at least one type of electronegative ion directly attached to the carbon film. The second screen arranged behind the first screen is made out of a synthetic film comprising at least one zeolite crystalline body in direct contact with concentrically arranged nanocarbon tubules attached to the synthetic film. The synthetic film comprises a multiplicity of pores having a diameter of about 0.1 nm to about 3.0 nm. The zeolite crystalline bodies are attached to the nanocarbon tubules and overlap at least a portion of the pores. It is this structure that makes up a single repeatable unit and can be placed in series to generate higher outputs of oxygen from a given source.

The synthetic film comprises a multiplicity of pores having a diameter of about 0.1 to about 3.0 nm. The zeolite crystalline bodies are attached to the nanocarbon tubules and overlap at least a portion of the pores. It is this structure that makes up a single repeatable unit and can be placed in series to generate high oxygen output form water vapor, water vapor from exhaled air or another source.

The unique diruthenium/diruthenium molecule used in the first screen contains several ruthenium atoms. Chemically "ruthenium" is generally found in ores with the other platinum group metals in the Ural Mountains and in North and South America. Small but commercially important quantities are also found in pentlandite extracted from Sudbury, Ontario and in pyroxenite deposits in South Africa. Commercially ruthenium is isolated through a complex chemical process in which hydrogen is used to reduce ammonium ruthenium chloride yielding a powder. The powder is then consolidated by powder metallurgy techniques. Historically, ruthenium was realized out of residues that were left after dissolving crude platinum. Ruthenium is a transition metal and as with most transition metals are excellent Lewis acids. That is they readily accept electrons from many molecules or ions that act as Lewis bases. When a Lewis base donates its electron pair to a Lewis acid, it is said to coordinate to the Lewis acid and form a coordinate covalent bond. When Lewis bases coordinate to metals acting as Lewis acids and form an integral structural unit, a coordination compound is formed. In this type of compound, or complex, the Lewis bases are called ligands and such ligands may be cationic, anionic or charge neutral.

Another portion of the ruthenium complex of the present invention is a Polyoxometalates or "POM." As a class, POMs are very functional for use as catalysts and are able to activate molecular oxygen and/or hydrogen peroxide as reagents in oxidation reactions. However, one of the major problems with using ruthenium containing molecules as catalyst is the degeneration of the ruthenium catalyst and the danger of ruthenium poisoning to those in contact with its ions which may become dislodged/decomposed off its bound couple. The design of the filter material of the present invention overcomes these problems in part by using a uniquely designed siderophore.

The first screen of the filter material of the present invention comprises a boron doped synthetic carbon thin film and a charged plate bonded to the opposite side of the synthetic carbon film than the ruthenium complex. Both the boron doped synthetic carbon thin film and the charged plate function synergistically as siderophores. A siderophore is a compound that will attract and bond free charged ions. In other words, a complex that will capture freely charged ions before the ions continue through the filter materials and out of the filter and into the airflow of a person. The siderophores of the present invention are negatively charged so as to be specific for positive charged ions including ruthenium ions. Thus, capturing any positive ruthenium ions that may become dislodged from the complex of the present invention overcomes the shortcomings of using ruthenium as a catalyst for generating oxygen and therefore provides a safeguard against ruthenium poisoning.

One embodiment of the present provides a filter material for removing oxygen and/or hydrogen gas from a source comprising a porous boron doped carbon film having diruthenium/diruthenium molecules and at least one type of electronegative ion attached either directly to the carbon film or, optionally, via an intermediate compound and/or structure. Whether the diruthenium/diruthenium molecules of the present invention that are in direct contact with porous boron doped carbon film or are attached via an intermediate compound and/or structure, they are ionically bonded.

In one embodiment of the present invention, one diruthenium molecule of each of the diruthenium/diruthenium molecules of the present invention has the following formula (I) $[Ru_2(CO)_4(u\text{-}n^{2-}O_2CR)_2L_2]_x$, wherein u is a bridging ligand selected from the group consisting of $[Ru_2(EDTA)_2]^{2-}$, $(CO)_4$, $F^-$, $Co_3^{-2}$, $NO^+$ (Cationic), hydrogen-bonded aromatic/carboxylic Acid—(either for multiple attachments as polymerization or singular, at the double bonded oxygen or sites within), ethylenediamine, halides as anionic ligands, carboxylic acid, unsaturated hydrocarbons, nitric acid coordinating to a metal center either linear or bent, butadiene, carboxylate ligands, anionic (RO— and $RCO_2^{-2}$ (wherein R is H or alkyl group) or neutral ligands ($R_2$, $R_2S$, CO, $CN^-$), $CH_3CN$ (Acetonitrile), $NH_3$ (ammonia, amine) $F^-$, $Cl^-$, tris (pyrazolyl)borates, Scorpionate Ligand" a boron bound to three pyrazoles; the "pincers" of the compound refer to the nitrogen hetero atoms from two of the pyrazole groups ($C_3H_4N_2$) which can bind a metal) and mixtures thereof, preferably $[Ru_2(EDTA)_2]^{2-}$;

wherein n is at least 2 and depends on the denticity of the molecule—(that is, the number of donor groups from a given ligand attached to the same central atom);

wherein L is a ligand selected from the group consisting of $[Ru_2(Ph_2PCH_2CH_2PPh_2)(EDTA)]^{2+}$, $C_6H_6$, $R_2C{=}CR_2$ (wherein R is H or an alkyl), 1,1-Bisdiphenylphosphino methane, diethylenetriamine [diene] bonds preferably tridentate, triazacyclononane [diene] bonds preferably tridentate, triphenylphosphine and mixtures thereof;

wherein CR is carboxylic acid, carboxylate ligands, anionic ($RO^-$ and $RCO_2^-$ (wherein R is an alkyl group)) or neutral ligands ($R_2$, $R_2S$, $CO^-$, $CN^-$ (wherein R is an alkyl group)) and mixtures thereof; and x is about 1 to about 30, preferably 1 to about 20 and more preferably 1 to about 10.

The other molecule of each of the diruthenium/diruthenium molecules of the present invention is a diruthenium-substituted polyoxometalate having the following formula (II) $Na_{14}[Ru_2Zn_2(H_2O)_2(ZnW_9O_{34})_2]$ substituted to $WZnR^{III}_2(OH)(H_2O)(ZnW_9O_{34})_2]^{-14}$. The distance between each ruthenium in the ruthenium molecule is about 2.0 angstroms to about 3.18 angstroms, preferably about 2.25 angstroms to about 3.0, and more preferably about 2.50 angstroms to about 2.80 angstroms.

For example, the Ru—Ru distance of 3.18 Å of the $Na_{14}[Ru_2Zn_2(H_2O)_2(ZnW_9O_{34})_2]$ substituted to $WZnR^{III}_2(OH)(H_2O)(ZnW_9O_{34})_2]^{-14}$ as an electrocatalyst POM disclosed in U.S. Pat. No. 7,208,244 limits the amount of oxygen that may be generated. Also, because the POM structure as used in the prior art is subject to torsion and rotation upon impact by water molecules, the consistency of oxygen generation is necessarily limited in a system involving water flowing at even modest rates. Accordingly, neither diruthenium POMs nor di-ruthenium sawhorse molecules have heretofore been used for the generation of breathable oxygen.

In one particular embodiment of the present invention, the di-ruthenium-substituted polyoxometalates described in U.S. Pat. No. 7,208,244 to Shannon et al., the entirety of which is herein incorporated by reference, can be used to in connection with the boron doped carbon thin film as described above so as to provide the benefits inventive filter material.

In yet another embodiment of the present invention, the filter material further comprises a Ruthenium ion capturing siderophore plate connected to the opposite surface of the carbon film in which the diruthenium/diruthenium molecule is attached. The siderophore plate is ionically charged so as capture free ruthenium ions that become dislodged from said porous boron doped carbon film. The siderophore plate can be selected from the group consisting of negative or positive charged ions, in particularly resin clay in which the clay is molded into a hollow tubular plate having a plurality of pores. In particular, the siderophore can be polysulfinate impregnated resin, ethylenediaminetetraacetic acid (EDTA) containing and mixtures thereof. In one particular embodiment of the invention the siderophore plate is attached to one end of the nanotubules of the carbon doped film and at least a portion of the siderophore plate is directly attached and/or embedded into the thin film. This design allows the siderophore plate to be capable of capturing and ionically bonding free ruthenium ions.

As discussed above, this is essential when the filter material having Ruthenium atoms is used to produce oxygen for breathing. In an embodiment wherein oxygen produced by the filter material is not used for breathing but is used instead for an industrial process, the siderophore plate is less important.

In yet another embodiment of the present invention, the porous boron doped carbon film can further comprises a nanocarbon tubular mesh network. The nanotubles of the nanocarbon tubular mesh network have a diameter of about 20 nanometers to about 450 nanometers, preferable 20 nanometers to about 250 nanometers and more preferably about 20 nanometers to about 100 nanometers. The nanocarbon tubular mesh network is designed so that each tubule can carry large currents in a relatively low resistance flow, which is used to destabilize the oxygen-hydrogen bonds in water so as to make them easier to split the bonds in order to produce bimolecular oxygen and/or hydrogen. According, the energy and the time necessary to split the bonds is less, thus making it quicker and easier to produce bimolecular oxygen. The nanotubule network extends above the supporting POM matrix by about 0.2 to about 5.0 microns.

Attaching the diRuthenium to the carbon thin film begins with the attachment of the carbon to a substrate. In one embodiment of the present invention a silicon substrate, or like, is used to allow the carbon atoms from Chemical Vapor Deposition (CDV) to nucleate on the substrate surface initiating the tetrahedral coordinated Sp3 orbital network. The CDV are hydrogen and methane as precursor gases which using the "heated methodology". The heated methodology, for example, can use a filament to provide the diffusion of the reactive species mostly "methyl radical" to interact with the substrate surface and allow the carbon atoms to be absorbed by the surface and growth coalescence to occur. Once complete the thin-filmed surface is believed to be primarily tertiary carbon atoms with single C—H bonds.

The doping of the carbon thin film may be completed using boron, fluorine and/or nitrogen. With increased concentrations of the doping level, the insulator behavior of the diamond (carbon) alters to one of a semiconductor and further to a full metallic behavior. In order to achieve this electrochemistry effect, the level of boron doping has to be sufficient to cause a low ohmic drop in the diamond (carbon) level, but not so low as to alter or disturb the crystalline structure inducing a graphite phase during the doping synthesis. One way this can be achieved is to do the doping with fluorine as a compounded vapor, where upon contact with the carbon thin film, the fluorine interacts with both the hydrogen and boron forming a bond as the ion. Another possible way to achieve this is doping the carbon with a mixture of both boron and fluorine. As fluorine is a case of negative doping i.e., the negative F atom has an extra electron and a slightly lower energy level. (i.e. about 0.028-0.32 eV as opposed to boron at about 0.35 eV). Typically, the carbon-fluoride bond is covalent and very stable, as can be seen in several common fluorocarbon polymers, such as, poly(tetrafluoroethene) and Teflon. In the alternative, the invention may utilize the deposition of graphite onto the substrate to produce nanotubules by micromechanical cleavage of high quality graphite.

Still yet another alternative is to vapourize the boron oxide and low volume-molar hydroflourine (less than about 0.22 litters to about 0.34 liters per about 1.9 liters to about 2.5 liters methane). As discussed above, fluorine containing compounds such as, perfluoroalkyl-alkoxy silanes and/or trifluoropropyl-trimethoxysilane (TFPTMOS), can be used to interact with the carbon boron doped thin film providing that the fluorine containing compound has at least one carbon-metal bond per molecule. The —$CF_3$ and —$OCF_3$ moieties provide further variation, and more recently the —$SF_5$ group. An additional alternative in utilizing the boron doped with the fluorine atoms as $BF_3$.

Still yet another alternative is the vaporizing the boron oxide and hydrofluoroine gas to interact with the methane and using fluorine containing compounds, as pointed out above, such as perfluoroalkyl-alkoxy silanes, with trifluoropropyl-trimethoxysilane (TFPTMOS) being preferred. A necessary requirement is that the fluorine containing compound has at least one carbon-metal bond per molecule.)

The thin film functions now as a Semiconductor as in this case of our shell composed of the boron doped synthetic diamond (carbon) thin film, which is also used as anchor, and the bonding to keep the alignment of the ruthenium complexes in the sawhorse orientation and as well as POM from excessively separating and twisting when flows greater than 20 liters/min and/or water flows of greater than 4 liters/25 seconds are passed across the filter material of the present invention. Therefore, not only does the boron doped carbon thin film provide semiconductor properties, but it also functions to prevent the diruthenium molecules from becoming distorted under high flows. In addition, the boron doped carbon thin film together with the fluorine causes an inductive effect that amplifies the electronegative moiety bonded to the sawhorse orientated ruthenium complex as well as both inner sphere ligands while equally extending out to the diruthenium-POM as outer sphere bonding.

The carbon in the diamond or graphite structure is $sp^3$ hybridized while the Boron (non carbon, i.e., non-diamond) is $sp^2$ species. The specific hybridization states of the carbon and boron discussed above are important in providing electrical conductance to the thin film so that the thin film functions as both an anchoring substrate and an oxygen generating electrode. In order to be effective for the stated purpose above, the thin film must be boron doped in a range between about 2100 ppm to about 6,800 ppm/0.1 cm of thin film (screen) size.

In yet another embodiment of the present invention, the filter material of the present invention further comprises a synthetic film comprising a plurality of nanocarbon tubules attached and/or embedded thereon to form a nanocarbon tubule mesh network. The synthetic film of the present invention is selected from the group consisting of $SiO_4$, $AlO_4$, and mixtures thereof. The crystal structure is based upon repeating units consisting of a silicon atom (+4 valence) surrounded by four oxygen atoms (−2 valence) in a tetrahedral configuration. Two Si atoms, giving the tetrahedral net valence of zero, share an oxygen molecule. When aluminum (with a valence of +3) is substituted in the tetrahedral orientation a net charge −1 occurs and thus gives rise to the cation exchange properties of zeolites (further discussed below). The synthetic film being positioned in close communication with the surface of the porous boron doped carbon film in which the siderophore is attached. The synthetic film of the present invention further comprising at least one zeolite crystalline body that is in direct contact with the nanocarbon tubule mesh network attached and/or embedded thereon. The synthetic film has a multiplicity of pores with a diameter of about 0.1 to about 3.0 nm, preferably about 0.1 nm to about 3.4 nm and more preferably about to about 2.0 nm to about 2.9 nm.

In one embodiment of the present invention, the zeolite crystalline bodies are directly attached to the nanocarbon tubules of the nanocarbon tubule mesh network so that the zeolite crystalline bodies overlap at least part of the pores in the synthetic film. This configuration allows oxygen and/or hydrogen generated from the reaction of water molecules with the zeolite/nanotubles to flow through the pores of the synthetic film to be collected and used for a given purpose. It is the combination of the diruthenium/diruthenium containing porous boron doped carbon film and the synthetic film containing zeolite crystalline bodies attached to the nanocarbon tubule mesh network overlapping at least part of the pores in the synthetic film that forms a repeating unit of the filter material of the present invention.

Zeolites used in the present invention have a crystal structure constructed from a $TO_4$ tetrahedral configuration, where T is either Si or Al. In addition to a large number of naturally occurring zeolites there is a wide range of synthetic zeolites as well. The crystal structure of zeolites is based upon repeating units consisting of a silicon atom (+4 valence) surrounded by four oxygen atoms (−2 valence) in a tetrahedral configuration. Each oxygen atom is shared by two Si atoms, giving the zeolite is a tetrahedral structure and a net charge of zero. When aluminum (with a valence of +3) is substituted in the tetrahedral configuration the zeolite will have a net charge of −1. This negative charge gives rise to the cation exchange properties of zeolites. Zeolites also have very uniform defined pore sizes as well as high porosity, which occur as a consequence of their unique crystal structures. For this reason, zeolites are useful as molecular sieves.

However, un-split water frequently blocks the pores of certain zeolites and therefore often these zeolites often become fouled and loss their separation qualities. The structure of the filter material of the present invention allows the zeolites attached to the tubular mesh network to remain "unclogged" and functional for a longer period of time because the nanotubles of the filter material destabilizes the hydrogen/oxygen bond in water thereby making it easier for the diruthenium molecules of the filter material to split water into oxygen and hydrogen. The more water that is split by the diruthenium molecules, the higher the oxygen/hydrogen generation and the less water available to clog the pores of the zeolite attached to the nanotubules of the synthetic film of the present invention. Once the oxygen and/or hydrogen are generated it can be captured and used for breathing, storage or industrial uses.

The pore size of the zeolites used is also critical. If the pros are too large water can pass through the zeolite filter and not be split to oxygen and hydrogen, too small the oxygen and/or hydrogen produced can be retained and not passed out of the filter so that they can be utilized. Therefore, it is important that it is possible to fine-tune the pore opening of zeolites so as to allow the adsorption of specific molecules while excluding others based on size. One method to change the pore size of the zeolite is to change the exchangeable cation from one cation to another. For example, when Na+ ions are replaced by Ca++ ions in zeolite A, the effective aperture size increases. This can also be accomplished by changing the Al/Si ratio in the zeolite. An increase in the ratio of Si to Al will slightly decrease the unit cell size, decrease the number of exchangeable cations, thus freeing the channels and make the zeolite more hydrophobic in character.

Zeolite used in the present invention are mainly composed of alumin-silicates wherein the alumina substrate contains alumina pores that function as molecular sieves that allow some atoms but excludes others so as to purify a chosen end product. For purpose of this application the term "molecular sieve" refers to a particular property of these materials, i.e. the ability to selectively sort molecules based primarily on a size exclusion process. The zeolites that can be used in the present invention include any one of a family of hydrous aluminum silicate minerals, typically of alkali metals and alkaline earth metals whose molecules enclose cations of sodium, potassium, calcium, strontium, or barium, or a corresponding synthetic compound.

Accordingly, the filter material of the present invention is constructed from the repeating unit comprising the boron carbon doped film containing diRuthenium molecules on one side of the film and an siderophore to capture free Ruthenium ions on the other, followed by a synthetic film containing a carbon nanotubular mesh network attached to synthetic film and the zeolite crystalline bodies. Several of these repeating units can be amassed in series so as to provide a filter material for high output oxygen and/or hydrogen generation. This unique filter material combines two different materials, which results in a new material having characteristics that are different than those of the basic materials. As such, the filter material of the present invention not only electro-generates a high quantity of bimolecular oxygen but using the direct pass through filtration via the molecular sieve "zeolite media," captures the bimolecular oxygen for use for breathing devices, storage or industrial usage.

The nanocarbon tubular mesh network embedded on the surface of the synthetic film extends about 0.1 to about 7 millimeters above the surface of the zeolite coating synthetic film, preferably about 0.2 to about 6 millimeters and more preferably about 0.2 to about 6 millimeters. As with the nanotubles associated with the diruthenium containing carbon-doped film, the nanocarbon tubules can have a diameter of about 20 nanometers to about 450 nanometers. The nanocarbon tubular mesh network can be embedded on the surface of the synthetic film using any of the following procedures electron-beam lithography, atomic force microscopy, chemically charged molecular ink, crystallization self-assembly, seeded self-assembly, and mixtures as well as any other procedure that does not affect the pores of the synthetic film to which it is embedded.

One application that can be used in the present invention would be the use of direct visualization during the embedding process as that by "IBM Almaden's Materials Characterization and Analysis Lab," which uses a FEI 830 Dual Beam system that integrates the FIB (Focused Ion Beam) with a ultra-high-resolution SEM, allowing the analyst to capture an image of a specific site while performing a milling or deposition procedure. In making the carbon thin film, the thin film is first milled by accelerated gallium ions so as to dig the initial hole for the nanocarbon tubules to be embedded with the born doped thin film. Once completed, a carbon metal oxide is deposited within the milled region to form a pattern and underside of the carbon tubules while an inert gas, such as Argon, is pumped onto the surface of the thin film. Additional carbon doped atoms are deposited onto the argon gas surface above the nanocarbon tubule concavity previously formed in the thin film by the gallium ions. The deposition may be completed either by ALD (atomic Layer Deposition) or CVD so that the carbon tubules are laid down in a concentric pattern extending from the innermost point of the thin film outward.

Once carbon nanotubule is completed, the end portion of the carbon nanotubule is left open so that current can be applied within the carbon nanotubules. The diruthenium molecules are then either aerosolized onto the prepared surface or applied using CVD so as to bond with the boron fluorine at the newly prepared thin film surface.

In the alternative, the method used to form the carbon boron doped Fluoride film could be by radio frequency magnetron sputtering using a composite target consisting of h-BN and graphite in an Ar—$Fl_2$ gas mixture, said mixture formed by photolysis of hydrogen fluoride in a solid argon matrix leading to formation of argon fluorohydride (HArF). Subsequent to the formation, the carbon doped fluoride thin film may be characterized by X-ray diffraction, Fourier transform infrared spectroscopy and/or X-ray photoelectron spectroscopy. Descriptions of these procedures can be found in *Preparation of boron carbon nitride thin films by radio frequency magnetron sputtering, Applied Surface Science*, Volume 252, Issue 12, 15 Apr. 2006, Pages 4185-4189. Lihua Liu, Yuxin Wang, Kecheng Feng, Yingai Li, Weiqing Li, Chunhong Zhao, Yongnian Zhao; and *A stable argon compound*. Leonid Khriachtchev, Mika Pettersson, Nino Runeberg, Jan Lundell & Markku Räsänen. Department of Chemistry, PO Box 55 (A.I.Virtasen aukio 1), FIN-00014 University of Helsinki, Finland. *Nature* 406, 874-876 (24 Aug. 2000).

The nanocarbon tubular mesh network of both the boron doped film and the synthetic film can be arranged in concentric spaced circles starting form the center region of the either the porous boron doped carbon film or the zeolite synthetic film outwards.

Overall the filter material of the present invention is designed so that the zeolite synthetic film screen is placed behind the diruthenium boron doped thin film screen so that the diruthenium screen is proximal to the air flow, i.e., the airflow contacts the diruthenium screen first. In this way moisture contained in the airflow is impacted and electrochemically aided so as to enhance the splitting of water into hydrogen and oxygen. The zeolite and diruthenium screens function in tandem. In one preferred embodiment of the present invention, a set of six screens can be contained within a cartridge having a frame that can be used in a patient breathing device. The diruthenium center and outer border sandwiching the zeolite center bonded to and surrounded by diruthenium walls can be analyzed postproduction by FTIR and or X-ray crystallography for its accuracy and bonded interface.

The cartridge designed so that it can be removed and replaced when needed. The cartridge can be made to be recyclable or can be a single use device. Many different configurations for the cartridge are possible and do not limit or change the functionality of the filter material of the invention. That is, providing filter material that alternates between a new type of diruthenium/diruthenium boron doped thin film screen and a new type of zeolite synthetic film screen that functions in tandem to produce bimolecular oxygen to an individual patient for breathing, to an oxygen storage device or to an industrial consumer. The present inventions unique design simultaneously prevents build up of radical intermediates during oxygen generation and prevents decomposition of the oxygen catalysts and anion electrodes used in the filter material of the present invention.

Specific embodiments of the present invention will be described in conjunction with the attached figures, which are provided to better describe the invention and should not be regarded as limiting the present invention in any way.

FIG. 1 is shows a prospective view of the front surface of the porous boron doped carbon film comprising diruthenium/diruthenium molecules of the filter material of the present invention (10). As stated above and shown in FIG. 1, the mesh-like material in which the screen is made of is a carbon boron doped screen (15) having a top (55), a bottom (60), a right side (45) and a left side (50). Alternative shapes such as circular, oval, elliptical, parallelograms in particular, square, rectangular and triangular are also within the scope of the invention.

FIG. 1 shows a rectangular screen for description purposes only but other shapes are envisioned to fall within the scope of the present invention. Deposed or embedded in the carbon boron doped screen (15) are nanocarbon tubules (20) that originate from a central point in the screen and radiate outwards to form a loosely packed coil structure in a concentric arrangement. Although the nanocarbon tubules are concentrically arranged, in the alternative, embodiments wherein the nanocarbon nanotubules can be arranged in different patterns depending on the design and shape of the carbon boron doped screen (15). The different arrangements of the nanotubules, as with the different shapes of the screen, are also envisioned to fall within the scope of the invention.

Dispersed throughout the carbon boron doped screen (15) are numerous boron atoms (25). These boron atoms (25) can be evenly dispersed throughout the screen or may be concentrated within the area of the nanocarbon tubules. Approximately in the center region of the nanocarbon screen (15) is at least one diruthenium-substituted polyoxometalate (POM) complex (40). As described above, in one embodiment of the present invention the polyoxometalate (POM) complex (40) comprises a diruthenium sawhorse molecule (35) attached to a POM (30). The diruthenium sawhorse molecule (35) is located closet to the screen while the POM (30) extends out of the face of the screen. This arrangement allows for quick and efficient degradation of water into bimolecular oxygen and hydrogen. This arrangement makes of the first screen of a repeating unit of the filter material of the present invention.

Figure 2:
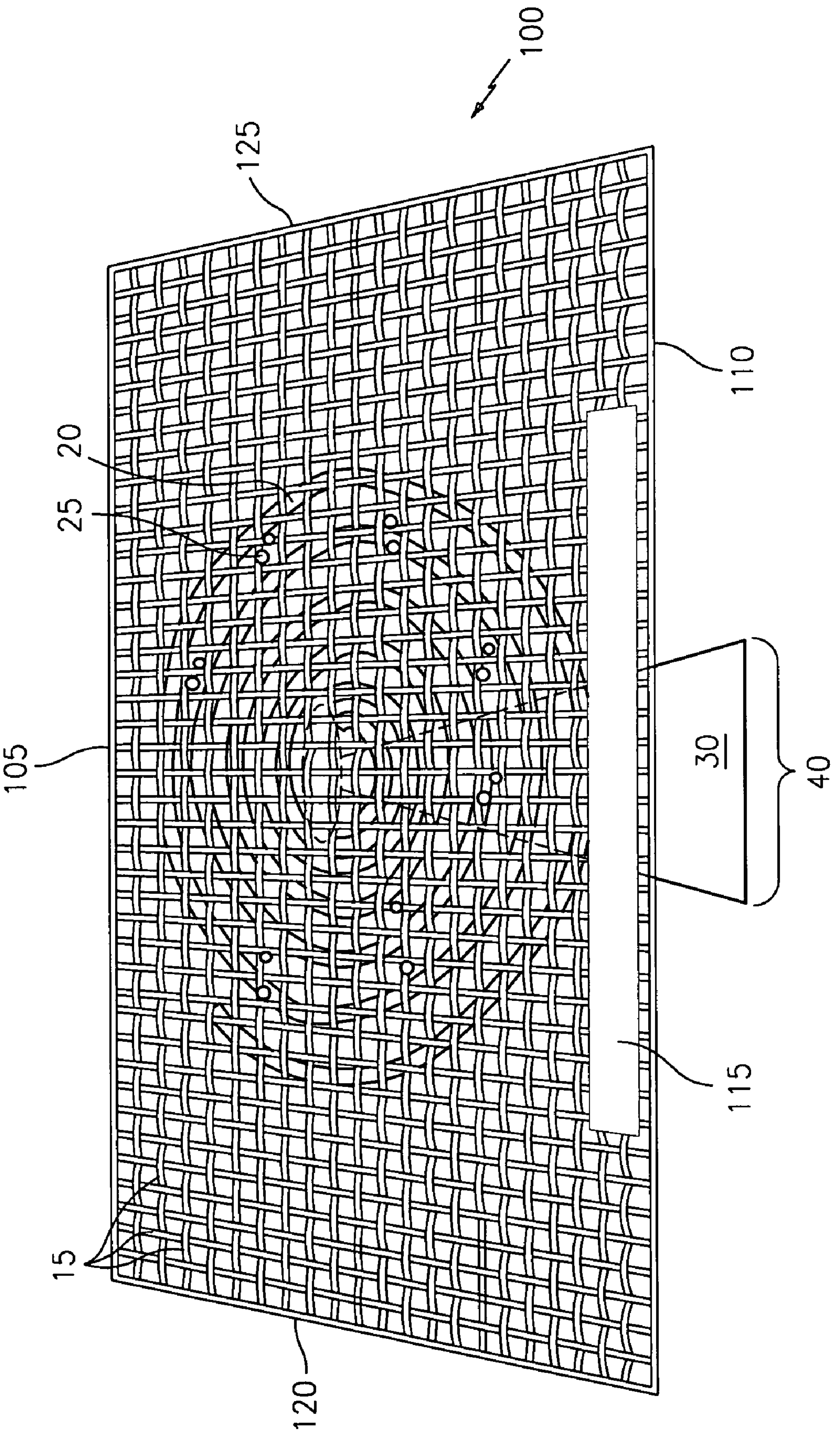
FIG. 2 shows a prospective view of the back surface of the porous boron doped carbon film comprising diruthenium/diruthenium molecules and siderophore plate of the filter material of the present invention.

FIG. 2 shows a prospective view of the back surface of the porous boron doped carbon film (100) comprising diruthenium/diruthenium molecules and a siderophore (115). The carbon boron doped screen of the invention has a top (105), bottom (110), a left side (120) and a right side (125). The siderophore (115) is shown in FIG. 2 as being located at the bottom (110) of the screen, however, it is within the scope of the invention for the siderophore (115) to be located in other portions of the screen depending on the shape of the screen and the arrangement of the nanotubules. The carbon boron doped screen (15) contains boron atoms (25) as oriented as in FIG. 1 as well as carbon nanotubules (20) and at least one diruthenium-substituted polyoxometalate (POM) complex (40) as shown in FIG. 1 and discussed above.

The siderophore (115) can be in the form of a hollow tubular structure having a plurality of pores wherein at least one end of the siderophore (115) is in direct communication with at least one end of the nanocarbon tubules. In the alternative, the siderophore (115) can be in the form of an ionically charged plate. Either configuration is designed to capture charged ions such as, ruthenium ions that may become dislodged from the filter material so as to protect a patient breathing the oxygen produced by the filter material from inhaling the free ruthenium ions. Either the plate or the hollow tube siderophore (115) can be constructed from impregnated polysulfinate resin, ethylenediaminetetraacetic acid (EDTA) and mixtures thereof.

Figure 3:
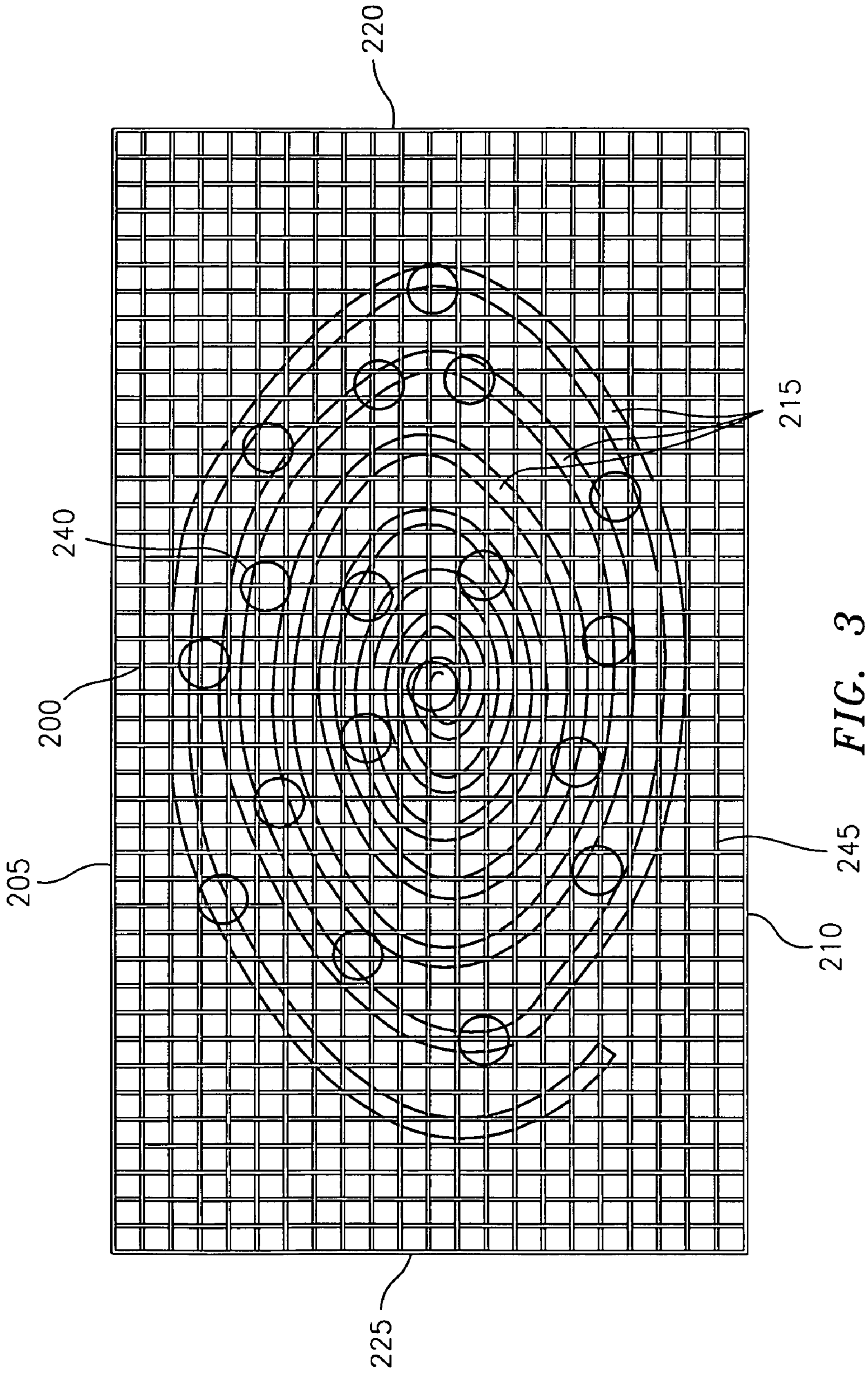
FIG. 3 shows a cross-sectional view of the surface of the synthetic film comprising zeolite crystalline bodies of the filter material of the present invention.

FIG. 3 shows a cross-sectional view of the surface of the synthetic film comprising zeolite crystalline bodies of the present invention (200). This is the next screen in the repeating unit of the filter and is positioned facing the back surface of the boron doped carbon film having the siderophore shown in FIG. 2. The synthetic film (200) has a top (205), a bottom (210), a right (220) and a left (225) side and is shown in a rectangular configuration. As with the first screen, the synthetic screen is shown in a rectangular shape but alternative shapes such as circular, oval, elliptical, parallelograms in particular, square, rectangular and triangular are envisioned to fall within the scope of the invention. That is, FIG. 3 shows a rectangular screen for description purposes only but other shapes fall within the scope of the present invention.

As with the boron doped carbon film of FIGS. 1 and 2, the synthetic film has carbon nanotubes embedded or deposed thereon. The synthetic screen also has zeolite crystalline bodies (240) in direct contact with the nanotubules (215), the synthetic film or both.

Figure 4:
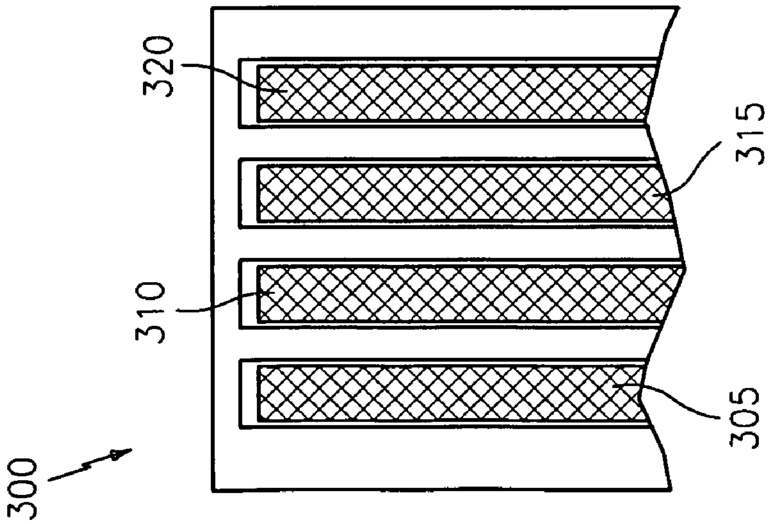
FIG. 4 shows a cross sectional view of a plurality of alternating screens of the filter material of the present invention.

FIG. 4 shows a cross sectional view of a plurality of alternating screens of the filter material of the present invention (300). The alternating stacked arrangement comprises a first boron doped carbon film comprising diRuthenium/diRuthenium molecules and at least one siderophore (305). The second screen in the filter material of the present invention is the zeolite containing synthetic film (310) which is followed by another boron doped carbon screen (315) and then another zeolite containing synthetic film (320). This repeating alternating stacking of the two types of screens can be repeated until the desired number of screens is reached. The screens can each have a frame that can be encased in a cartridge or in the alternative the screens can be frameless and encased in a cartridge as frameless. The cartridge assures the integrity of the filter material made from the alternating repeating screens.

Figure 5:
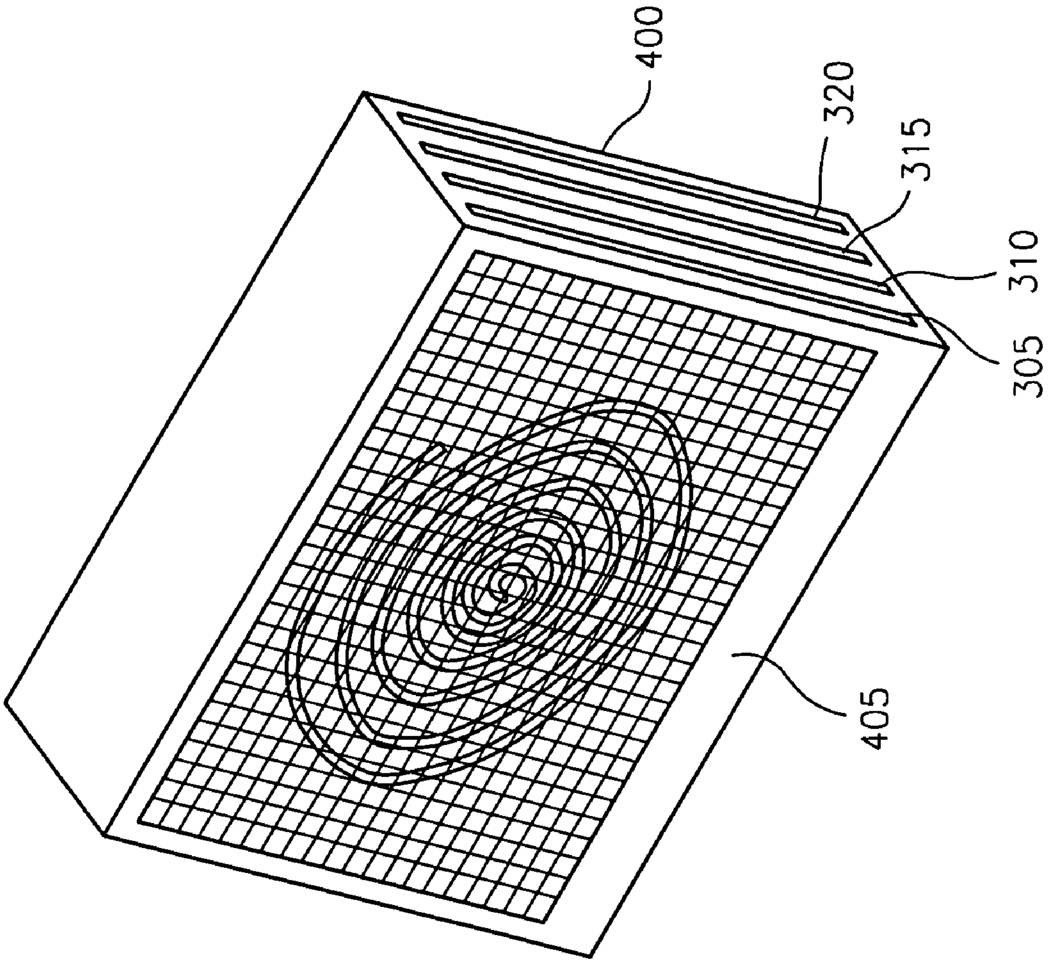
FIG. 5 shows a prospective view of a plurality of alternating screens of the filter material of the present invention in a filter cartridge.

FIG. 5 shows a prospective view of a plurality of alternating screens of the filter material of the present invention in a filter cartridge (400). This cartridge (400) can have many different shapes and sizes and can be used in a oxygen producing machine for breathing or in the alternative an oxygen producing device used for industrial purposes as described above.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A filter material for generating/removing oxygen and/or hydrogen gas from a source comprising:

a porous boron doped carbon film comprising diruthenium/diruthenium molecules and at least one electronegative ion/compound that produces an electronegative ion selected from the group consisting of perfluoroalkyl-alkoxy silanes, trifluoropropyl-trimethoxysilane (TFPTMOS) fluorine compounds having at least one carbon-metal bond per molecule, —$CF_3$ moieties, —$OCF_3$ moieties, —$SF_5$ moieties, $BF_3$, nitrogen, and boron, said diruthenium/ruthenium molecules and said electronegative ion/compound are positioned in direct contact with said porous boron doped carbon film whereby oxygen and/or hydrogen gas is generated from a source as it passes across said filter material.

2. The filter material of claim 1 wherein said diruthenium/diruthenium molecules in direct contact with said porous boron doped carbon film is ionically bonded.

3. The filter material of claim 1 wherein said porous boron doped carbon film further comprises a nanocarbon tubular mesh network.

4. The filter material of claim 1 wherein one diRuthenium molecule of each of said diruthenium/diruthenium molecules has the following formula (I)

$$[Ru_2(CO)_4(u\text{-}n^{2-}O_2CR)_2L_2]_x \quad (I)$$

wherein u is a bridging ligand selected from the group consisting of $[Ru_2(EDTA)_2]^{2-}$, $(CO)_4$, $F^-$, $CO_3^{-2}$, $NO^+$ (Cationic), hydrogen-bonded aromatic/carboxylic Acid—(either for multiple attachments as polymerization or singular, at the double bonded oxygen or sites within), ethylenediamine, halides as anionic ligands, carboxylic acid, unsaturated hydrocarbons, nitric acid coordinating to a metal center either linear or bent, butadiene, carboxylate ligands, anionic (RO— and $RCO_2^{-2}$ (wherein R is H or hydrocarbon) or neutral ligands ($R_2$, $R_2S$, CO, $CN^-$), $CH_3CN$ (Acetonitrile), $NH_3$ (Ammonia amine) $F^-$, $Cl^-$, tris(pyrazolyl)borates and mixtures thereof, preferably $[Ru_2(EDTA)_2]^{2-}$;

wherein n is at least 2 and depends on the denticity of the molecule—(that is, the number of donor groups from a given ligand attached to the same central atom);

wherein L is a ligand selected from the group consisting of $[Ru_2(Ph_2PCH_2CH_2PPh_2)(EDTA)]^{2+}$, $C_6H_6$, $R_2C{=}CR_2$ (wherein R is H or an alkyl), 1,1-Bisdiphenylphosphino methane, diethylenetriamine [diene] bonds preferably tridentate, triazacyclononane [diene] bonds preferably tridentate, triphenylphosphine and mixtures thereof;

wherein CR is carboxylic acid, carboxylate ligands, anionic ($RO^-$ and $RCO_2^-$ (wherein R is an alkyl group)) or neutral ligands ($R_2$, $R_2S$, $CO^-$, $CN^-$ (wherein R is an alkyl group)) and mixtures thereof; and x is between 1 and about 30.

5. The filter material of claim 4 wherein one diruthenium of said diruthenium/diruthenium molecules of formula (I) is attached to a diruthenium-substituted polyoxometalate having the following formula (II)

$$[WZnRu^{III}_2(OH)(H_2O)(ZnW_9O_{34})_2]^{-14} \quad (II).$$

6. The filter material of claim 5 further comprising a ruthenium on capturing siderophore plate connected to the opposite surface of said porous boron doped carbon film in which said at least one diruthenium/diruthenium molecule is attached, said siderophore plate ionically charged so as capture free ruthenium ions that become dislodged from said porous boron doped carbon film.

7. The filter material of claim 6 wherein said siderophore plate is selected from the group consisting of a polysulfinate resin impregnated plate, ethylenediaminetetraacetic acid (EDTA) and mixtures thereof.

8. The filter material of claim 5 wherein the distance between each ruthenium in said diruthenium molecule is about 2.75 angstroms.

9. The filter material of claim 8 wherein said nanotubles of said nanocarbon tubular mesh network have a diameter of about 20 nanometers to about 450 nanometers.

10. The filter material of claim 4 wherein x is between 1 and about 10.

11. The filter material of claim 5 further comprising a synthetic film comprising a plurality of nanocarbon tubules attached and/or embedded on a surface of said synthetic film to form a nanocarbon tubule mesh network, said synthetic film positioned in close communication with said surface of said porous boron doped carbon film comprising said siderophore.

12. The filter material of claim 11 further comprising at least one zeolite crystalline body in direct contact with said nanocarbon tubules wherein said synthetic film comprises a multiplicity of pores having a diameter of about 0.1 about 3.0 nm wherein said zeolite crystalline attached to said nanocarbon tubules overlap at least part of said pores to form a repeating unit of said filter material for removing oxygen and/or hydrogen gas from a source.

13. The filter material of claim 11 wherein said synthetic film is $SiO_4$, $AlO_4$, and mixtures thereof.

14. The filter material of claim 11 wherein said nanocarbon tubular mesh network embedded on said surface of said synthetic film extends about 0.2 to about 5 millimeters above said surface.

15. The filter material of claim 12 wherein said nanocarbon tubules of said nanocarbon tubular mesh network have a diameter of about 20 nanometers to about 450 nanometers.

16. The filter material of claim 12 wherein said nanocarbon tubular mesh network is embedded on said surface of said synthetic film using electron-beam lithography, atomic force microscopy, chemically charged molecular ink, crystallization self-assembly, seeded self-assembly, and mixtures thereof.

17. The filter material of claim 2 wherein said nanocarbon tubular mesh network is arranged in concentric spaced circles starting form a center region of said porous boron doped carbon film outwards.

18. The filter material of claim 11 wherein nanocarbon tubules embedded on said surface of said zeolite containing synthetic film is arranged in concentric spaced circles starting form a center region of said porous boron doped carbon film outwards.

19. The filter material of claim 5 wherein said diRuthenium-substituted polyoxometalate of formula (II) is $Na_{14}[Ru_2Zn_2(H2O)_2(ZnW_9O_{34})_2]$.

20. The filter material of claim 12 wherein said diruthenium-substituted polyoxometalate of formula (II) is $Na_{14}[Ru_2Zn_2(H2O)_2(ZnW_9O_{34})_2]$.

21. A method for producing oxygen and/or hydrogen comprising providing a flow of air containing water across the filter material of claim 12 to produce oxygen and/or hydrogen from said filter material.

* * * * *